(12) United States Patent
Frankle et al.

(10) Patent No.: US 7,161,150 B2
(45) Date of Patent: Jan. 9, 2007

(54) HANDHELD ISOTOPE IDENTIFICATION SYSTEM

(75) Inventors: Christen M. Frankle, Los Alamos, NM (US); John A. Becker, Alameda, CA (US); Christopher P. Cork, Pleasant Hill, CA (US); Norman W. Madden, Livermore, CA (US)

(73) Assignee: Los Alamos National Security, LLC, Los Alamos, NM (US)

( * ) Notice: Subject to any disclaimer, the term of this patent is extended or adjusted under 35 U.S.C. 154(b) by 182 days.

(21) Appl. No.: 11/052,176

(22) Filed: Feb. 7, 2005

(65) Prior Publication Data

US 2005/0133726 A1 Jun. 23, 2005

Related U.S. Application Data

(63) Continuation-in-part of application No. 10/374,126, filed on Feb. 25, 2003, now abandoned.

(51) Int. Cl.
  *G01J 5/02* (2006.01)
(52) U.S. Cl. .............................. 250/339.06; 250/339.01
(58) Field of Classification Search ........... 250/390.01, 250/390.06
See application file for complete search history.

(56) References Cited

U.S. PATENT DOCUMENTS

| | | | |
|---|---|---|---|
| 4,418,918 A * | 12/1983 | Nicoll | 277/312 |
| 4,851,684 A * | 7/1989 | Martin et al. | 250/352 |
| 5,075,555 A | 12/1991 | Woldseth et al. | |
| 5,552,609 A | 9/1996 | Katagiri | |
| 5,604,349 A | 2/1997 | Berst et al. | |
| 5,811,816 A | 9/1998 | Gallagher et al. | |
| 6,169,370 B1 * | 1/2001 | Platzer | 315/111.21 |
| 6,207,957 B1 * | 3/2001 | Kammeraad et al. | 250/370.1 |
| 6,380,544 B1 * | 4/2002 | Broerman | 250/370.15 |
| 6,396,061 B1 | 5/2002 | Madden et al. | |
| 6,577,697 B1 * | 6/2003 | Pearcy et al. | 376/159 |
| 6,727,505 B1 * | 4/2004 | Benke et al. | 250/393 |

OTHER PUBLICATIONS

Detective-EX HPGe-based Portable Nuclide Identifier□□.*
High Resolution Detection Systems for Interdiction of Nuclear Material Trafficking□□.*
Tsutsumi et al., Design of an Anti-Compton Sepctrometer for Low-Level Radioactive Wastes using Monte Carlo Techniques., Sep. 2002, Journal of Nuclear Science and Technology, vol. 39, pp. 957-963.*
Krotz, "Handheld Radiation Detector Could Outsmart Terrorists," Science Beat, http://www.lbl.gov/Science-Articles/Archive/Eng-Cryo3-Krotz.html, Feb. 15, 2002.

* cited by examiner

*Primary Examiner*—Otilia Gabor
*Assistant Examiner*—Christine Sung
(74) *Attorney, Agent, or Firm*—Mark N. Fitzgerald

(57) ABSTRACT

A portable radiation detector using a high-purity germanium crystal as the sensing device. The crystal is fabricated such that it exhibits a length to width ratio greater than 1:1 and is oriented within the detector to receive radiation along the width of said crystal. The crystal is located within a container pressurized with ultra-pure nitrogen, and the container is located within a cryostat under vacuum.

5 Claims, 4 Drawing Sheets

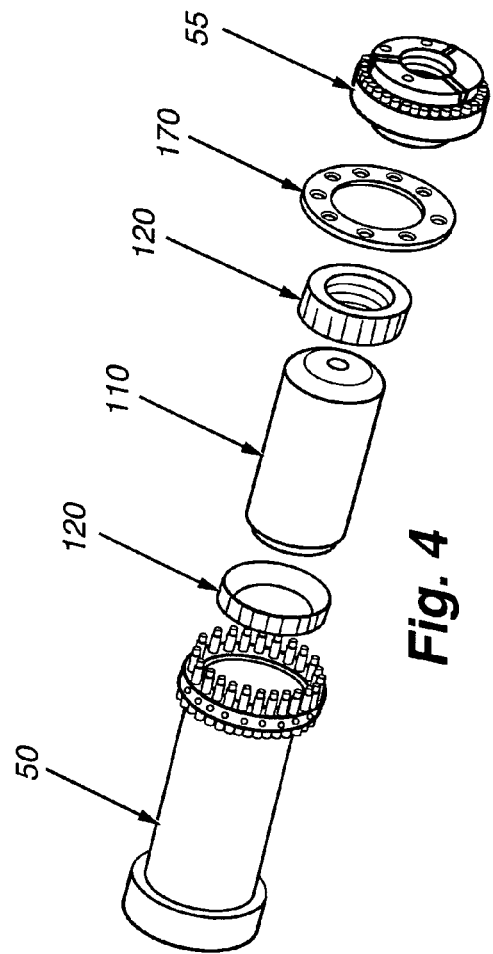
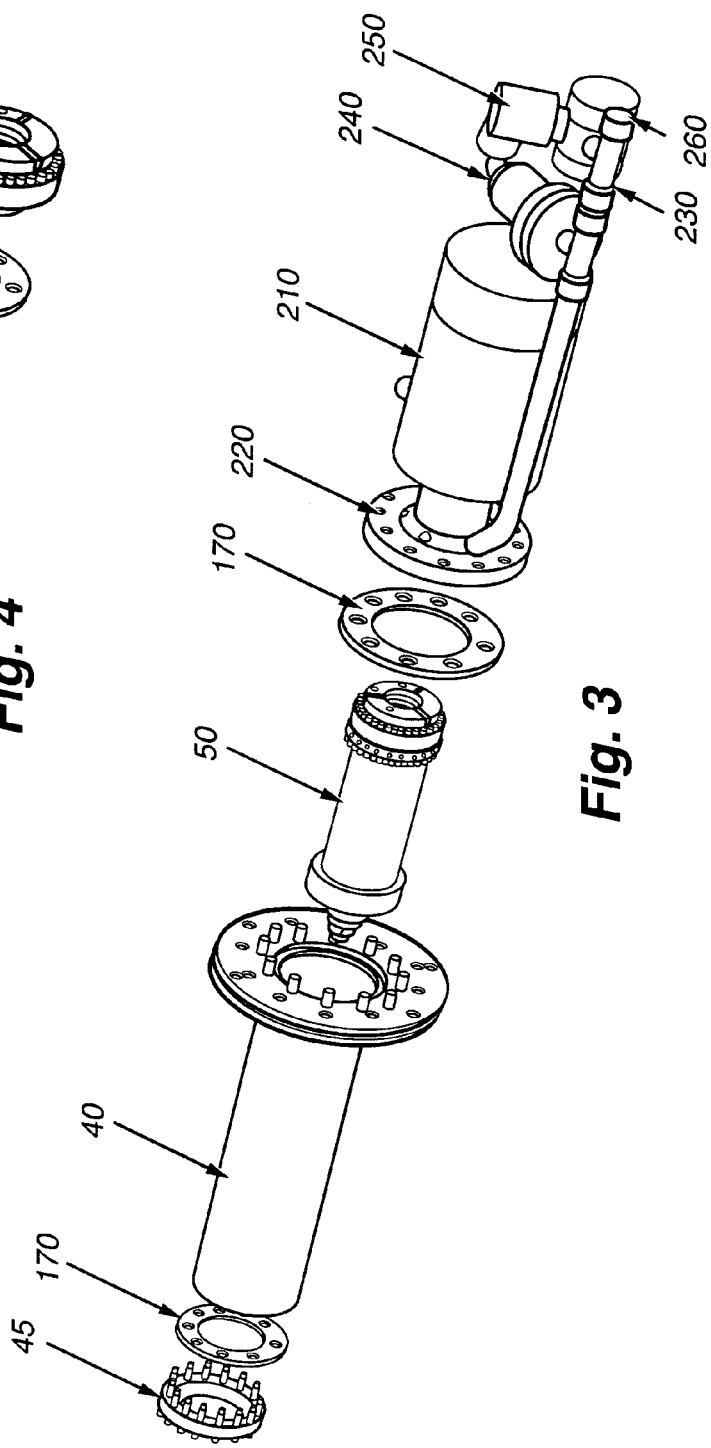

HANDHELD ISOTOPE IDENTIFICATION SYSTEM

RELATED APPLICATIONS

This application is a continuation-in-part of application Ser. No. 10/374,126 filed on Feb. 25, 2003 now abandoned by Cork et al., incorporated herein by reference for all purposes.

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The present invention relates generally to high-purity germanium (HPGe) semi-conductor diode radiation detectors, and, more particularly, to a miniaturized handheld multi-functional HPGe detector utilizing cyrocooler technology.

BACKGROUND OF THE INVENTION

One of many problems faced by governments today are illegal attempts to introduce nuclear materials within their borders. In order to adequately guard against the smuggling of such materials, there is a need to provide portable radiation detectors that exhibit a high degree of detection and isotopic identification capability, reliability, and ruggedness for field use.

The core technology behind the present invention is that of a high-purity germanium (HPGe) detector (semiconductor diode detector). As used herein, the high-purity classification means an electrically active impurity level less than 1 impurity in $2 \times 10^{10}$ germanium atoms. There are two primary historical threads related to the HPGe detector. The first is the detection of gamma rays of specific energy and the second is the cooling mechanism needed to allow the detector to perform properly. The objective in any radioisotope identification system is to identify the presence of one or more specific isotopes by detecting the characteristic gamma rays emitted by the isotopes. Most radioisotopes emit gamma rays (some 7,000 isotopes emitting roughly 100,000 gamma rays of unique energy) and each isotope has a characteristic "fingerprint" of one or more discrete energy gamma rays.

In view of the large number of discrete gamma rays given by nature, the better a detector can discriminate one energy from another, the better the detector is able to discriminate one isotope from another. This ability is referred to as the energy resolution of a detector and can be characterized as dE/E, i.e., the width (dE) of a peak in a measured spectrum from a discrete, isolated gamma-ray of energy E. When the quantities dE and E are both expressed in the same energy units then the ratio can be quoted as a percentage. The smaller the value of dE/E, the better the detector is at determining one isotope from another.

There are three main classes of gamma-ray detectors that exhibit the ability to determine energy resolution. The first, inorganic scintillators, has been available since the 1940's. The prime example of this class is thallium doped sodium iodide, NaI(TI). This class has the advantages of being easily fabricated in arbitrarily large crystals, operating at room temperature, exhibiting high intrinsic stopping power, relatively inexpensive, and extremely rugged. The disadvantage is that sodium iodide has a relatively low energy resolution of dE/E~8–10%, and the best inorganic scintillators are only somewhat better.

The second class of detectors is large band gap or so-called room temperature semiconductors. This is a relatively new class of detectors. They have significantly better energy resolution than the inorganic scintillators, having dE/E~2–3%. However, these detectors are presently limited in size to about ~1 cm$^3$. Since the ability to detect a gamma ray is scaled as the efficiency divided by the energy resolution, having such small detector sizes limits their usefulness, even though the energy resolution is much better compared to inorganic scintillators.

The third class of detectors is the HPGe detector. HPGe detectors were first fabricated in the 1970's. HPGe detectors have excellent energy resolution, typically dE/E~0.1–0.2%. HPGe detectors can also be made fairly large, exhibiting diameters of up to 12 cm and lengths of 11 cm, with a concomitant increase in detection capability. The primary disadvantage is that they must be cooled to around 80° K in order to work properly. In order to reach and maintain such a low temperature as 77° K, liquid nitrogen has historically been the cryogen of choice. However, use of liquid nitrogen precludes sustained use in portable handheld detectors as liquid nitrogen requires a complicated and bulky support system.

Roughly 20 years ago, mechanical cryocoolers of various designs capable of reaching 77° K without using liquid nitrogen entered the market. These were typically large, bulky units (10's of kg) with power consumption in the hundreds of Watts. In the early 1990's Hymatic, Inc., a U.K. defense contractor, licensed from Oxford University the design for a relatively small (~1 kg), low power (~10 W), rugged-mechanical cryocooler capable of cooling to 77° K. One of the first uses of this type of cooler was to cool HPGe detectors mounted on satellites in the mid 1990's. The present invention exemplifies the next step in HPGe evolution: utilizing a cryocooler in a handheld gamma ray detector instrument exhibiting exceptional energy resolutions Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the purposes of the present invention, as embodied and broadly described herein, the present invention includes a portable radiation detector using a high-purity germanium crystal as the sensing device. The crystal is fabricated such that it exhibits a length to width ratio greater than 1:1 and is oriented within the detector to receive radiation along the width of the crystal. The crystal is located within a container pressurized with ultra-pure nitrogen, and the container is located within a cryostat under vacuum.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings:

FIG. 3 is a pictorial illustration of the cryostat, HPGe crystal container, mechanical cooler, and vacuum support system of the handheld isotope identification system according to one embodiment of the present invention.

FIG. 4 is pictorial illustration of the HPGe crystal container.

DETAILED DESCRIPTION

Figure 1:
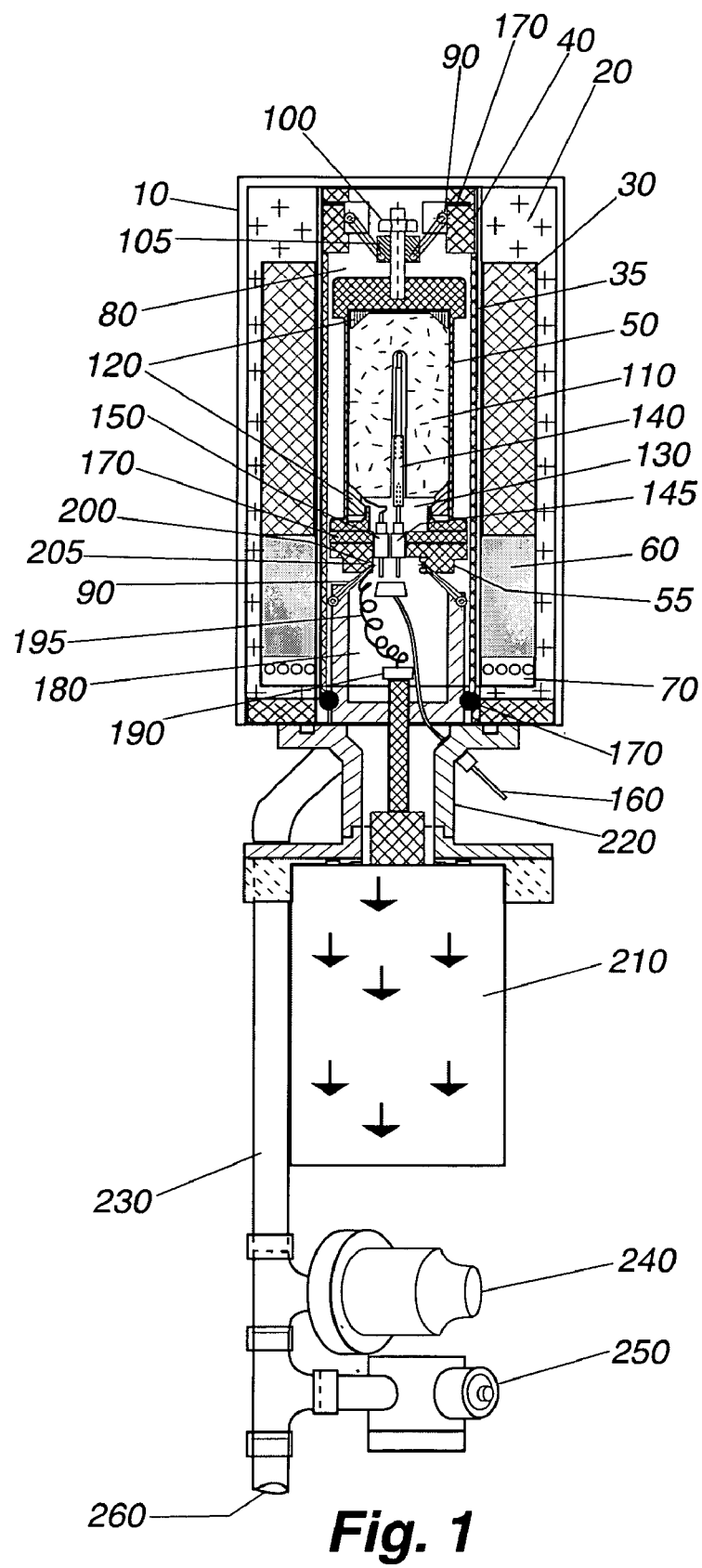
FIG. 1 is a cross-sectional view of the detector portion of the handheld isotope identification system according to one embodiment of the present invention.

The present invention is directed to a portable handheld radioisotope identification system utilizing a miniaturized high-purity germanium (HPGe) detector, two $He^3$ neutron detectors, and a compact electronics package with power source.

The design of the handheld radioisotope identification system centers around the use of an advanced, miniaturized HPGe detector. The base design of the HPGe detector follows conventional understandings of semi-conductor diode gamma ray detectors. Gamma rays pass through the casing of the detector and interact with a HPGe crystal. The characteristics of the crystal structure lead to the incident gamma rays creating electron-hole pairs along the path taken through the crystal. The electron-hole pair is analogous to the ion pair created in gas-filled detectors. Their motion in an applied electric field generates an electric signal. This signal is then carried out of the detector to an electronics package that processes the signal to determine a corresponding pulse height. This pulse height is then compared to an electronically resident library of gamma ray pulse heights, and a determination is made of the radioactive isotope that emitted the incident gamma ray.

In order to improve the ability of the detector to accurately determine the proper incident energy of the received gamma rays, a Compton suppression device is placed around the HPGe crystal container. Compton suppression designs reduce the background levels observed in gamma ray counting systems and have been in use for many years. Compton suppression allows for an increase in detection sensitivity by lowering the background created by Compton scattering. Compton scattering occurs when the full energy of an incident gamma photon is not completely absorbed by the HPGe crystal and exits the crystal, depositing only part of its energy to be measured. This partial energy signal appears in a gamma ray spectrum as an event below the full energy peak in the Compton Continuum, which is the range of energies corresponding to the Compton scattered electrons. The ratio of the full-energy peak to the Compton Continuum is called the Peak-to-Compton (or P/C) ratio.

In the HPGe detector of the present invention, it is common to have a Peak-to-Compton ratio of 8:1 and an energy resolution dE/E of 4 keV full width at half maximum (FWHM) measured at 1.332 MeV ($Co^{60}$). Because the escaping energy of the scattered gamma-ray is a photon, it is possible to intercept that energy with another detector. This is typically done with a large surrounding crystal made of a higher Z material such as Bismuth Germinate ($Bi_4Ge_3O_{12}$), which is known as a shield detector.

As the Compton scattered gamma ray interacts with the shield detector, the gamma ray causes the emission of light (scintillation); photo-multiplier tubes that are attached to the shield detector then detect this light. A preamplifier connected to the photo-multipliers sends the resulting electric signal to the electronics signal-processing package. By correlating events using timing electronics between the HPGe detector and the shield detector, events counted in the shield detector can be used to reject simultaneous events in the HPGe detector. The result is an advantageous suppression of the Compton continuum. In a Compton suppression system with a significantly improved lineshape, a Peak-to-Compton ratio of 20:1 at 4 keV FWHM resolution is achieved; a gain of more than a factor of 2. Thus, the Compton suppression system allows for a substantially smaller quantity of radioactive material to be detected and identified than by the HPGe detector alone, because of the improved lineshape resulting from the Compton suppression.

Referring now to FIG. 1, in a preferred embodiment, the Compton shield consists of an aluminum outer housing 10 surrounding layers of impact absorption materials: aluminum and Sorbothane® (visco-elastic polymer) 20. This design acts to reduce G-forces on fragile HPGe crystal 110 experienced from mishandling the detector during use in the field. Bismuth-germinate crystal 30 lies between inner wall 35 and impact absorption materials 20 and is placed to shield stainless steel/aluminum HPGe crystal container 50. Photomultiplier tubes 60 are placed in physical contact with bismuth-germinate crystal 30 to detect light photons generated by gamma rays incident on bismuth-germinate crystal 30. Electronic amplifiers 70 are attached to photomultiplier tubes 60 to boost the electronic signal. The Compton shield is cylindrical and open on both ends of the cylinder. The openings allow the Compton shield to slide over cryostat 40 (vacuum chamber) and also to allow incident gamma rays to enter HPGe crystal 110 without interference from materials within the Compton shield.

The bismuth-germinate shield detector may also be used as a stand alone detector to scan for radioactive materials emitting gamma rays. Although the energy resolution (dE/E) of bismuth-germinate crystal 30 is not equivalent to HPGe crystal 110, the high Z number of bismuth leads to a high photoelectric cross-section for gamma rays. Therefore, it is of interest when the need for high gamma ray counting efficiency outweighs considerations for improved energy resolutions of those detected rays. This allows the handheld detector to have a feature where one scans (searches) for radioactive materials utilizing the shield detector and then, once found, switching through the electronics package to use the HPGe detector in order to determine the energy of the emitted gamma radiation and, thus, the actual radioactive element that has been detected.

Figure 2:
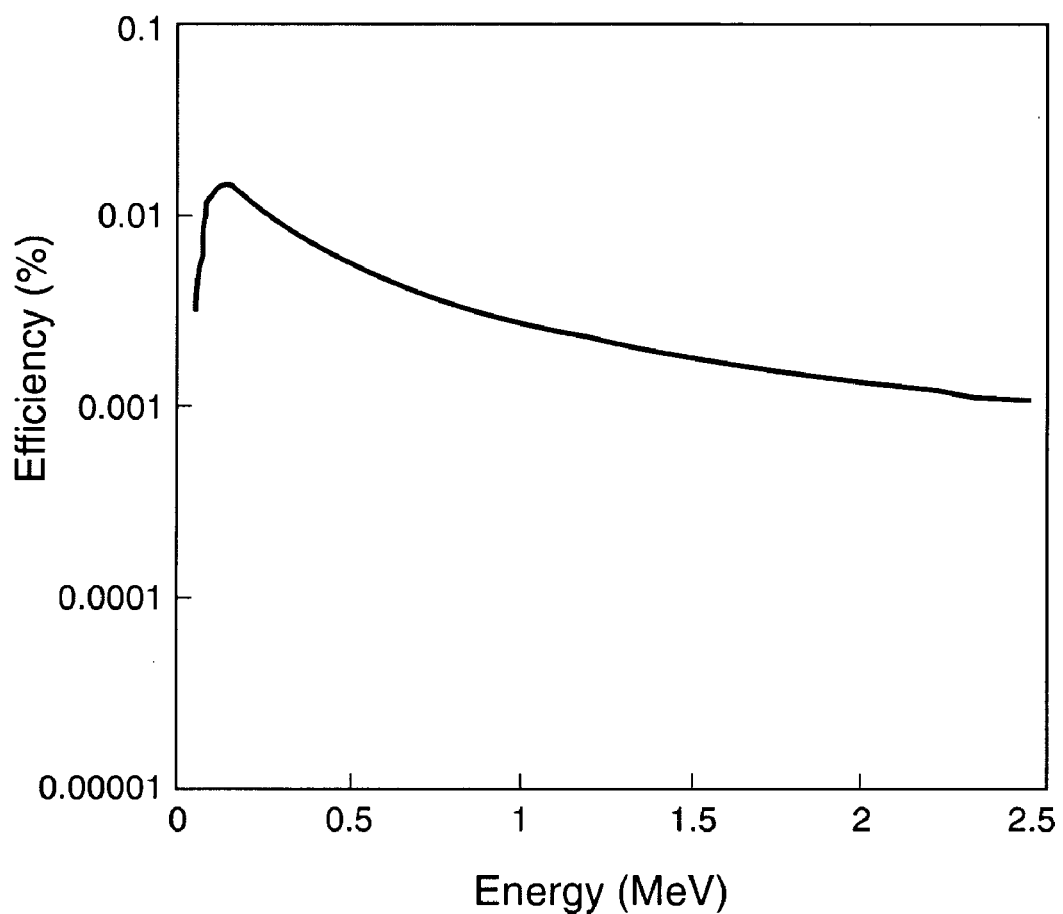
FIG. 2 graphically shows the improved efficiency curve of the advanced-miniaturized HPGe detector over a range of gamma-ray energies.

The present invention incorporates a significant improvement over conventional HPGe designs by modifying HPGe crystal 110. Conventional designs of HPGe crystals calls for an aspect ratio of approximately 1:1, thus the length and width of the crystal are the same. In order to improve efficiency for detection and identification of higher energy gamma rays, HPGe crystal 110 has an aspect ratio greater than 1:1. An exemplary crystal 110 with an aspect ratio of 2:1, where the length is twice the width, was fabricated by ORTEC®. During use, the detector is held in a position to receive incident gamma rays along the width of HPGe crystal 110, thus, allowing the incident gamma rays to preferentially interact traveling in the direction of the length of the crystal. This allows for a higher detector efficiency in detecting gammas with higher energies, as the more material available for interaction compensates for the lower cross sections inherent in higher energy gamma rays. Thus, the detector exhibits a very flat efficiency profile over a range of gamma-ray energies (refer to FIG. 2), unlike a typical detector where the efficiency decreases rapidly as the energy of the gamma ray increases. Alternatively, it allows for a similar high energy efficiency as a crystal with a 1:1 aspect ratio with the same length as the 2:1, but at a quarter of the weight and a quarter of the surface area. This is beneficial in that it reduces both weight and thermal load, improving portability of the detector.

HPGe crystal 110, with an aspect ratio of 2:1, is placed within HPGe container 50, a stainless steel and aluminum enclosure, and sealed with container cap 55. Preformed-tapered-Teflon® (polytetrafluoroethylene) rings 120 are placed between HPGe crystal 110 and HPGe crystal container 50 to reduce the possibility of crystal damage as a result of impact vibrations during field use of the detector. Free space 130 within HPGe container 50 is filled with ultrapure nitrogen (99.9999%), pressurized to 2 atmospheres, in order to provide a long-term environment that is contamination free.

The electric signal generated by incident gamma rays in HPGe crystal 110 is the result electron-hole formation within an electric potential field created between P+ contact 150, connected to the negative bias voltage, and inner electrode 140 (N+ contact of an n-type crystal) placed in the center of HPGe crystal 110. The electric signal is then transmitted out of HPGe container 50 through coaxial cable 160 to an electronics package for signal processing.

A significant improvement over previous HPGe detector design is the use of indium seals 170 for all the vacuum/pressure seals within the detector. Use of indium as the seal material ensures near zero leakage over the wide temperature ranges experienced from startup (ambient) to operation (80–140° K), and over extremely long periods of time. This is due to the very malleable characteristics of indium, a 0.9 Brinell-Hardness factor as compared to a 3.9 factor for lead, which allows the seal to maintain contact with the mated parts as they contract from the affects of a reduction in temperature. Thus, the use of this type of seal significantly prolongs the life of the detector over previous designs by preventing contaminants from adversely effecting HPGe crystal 110.

HPGe crystal 110 operates only at extremely low temperatures, on the order of 80–140° K. In order to achieve this environment in one aspect of the present invention features are provided to inhibit the transfer of heat by conduction, convention, and radiation from the outside of HPGe crystal container 50 to HPGe crystal 110. First, the inside surface of cryostat 40 and outside surface of HPGe crystal container 50 are highly polished and the electro-chemically plated with gold. This reduces the emissivity (heat radiation property) of the surface to minimize radiation. Second, a vacuum is maintained within cryostat 40, on the order of $10^{-7}$ Torr, minimizing any convective heat load. Third, HPGe crystal container 50 is suspended in cryostat 40 by seven thermally insulating fibers; in one embodiment, S-2 glass fiber 90 is used. S-2 is a high strength glass fiber produced by Structural Composite Industries, exhibiting low conduction and high strength properties. S-2 glass fibers 90 also reduce unwanted outside vibrations sensed by the HPGe crystal 110. Four S-2 glass fibers 90 are placed evenly apart and hooked to the inner wall of cryostat 40 and suspension ring 105 at the top of cryostat 40. Suspension bolt 100 is threaded through suspension ring 105 and into HPGe container 50. Three S-2 glass fibers 90 are placed evenly apart and hooked from the inner wall of cryostat 40 on the bottom of HPGe container 50 to complete the suspension.

Once the germanium crystal is thermally isolated, it remains to reduce the temperature of the crystal down to an operable range. Sterling-cycle-mechanical cooler 210 is commercially available from Hymatic Engineering Company, Lmtd, and is used to perform the temperature reduction. Relatively small cooler 210 (1 kg, 3.5 Watt) is a significant factor in allowing handheld portability when compared to the bulky liquid nitrogen cooling systems used in historical HPGe detector designs.

Vacuum enclosure 180 between cold tip 190 and HPGe container 50 is maintained at a vacuum, again to reduce any heat transfer due to convection. Copper braid 195 is attached from cold tip 190 to a copper clamp, which is itself attached to sapphire plate 200 on the back flange of HPGe container 50. The use of sapphire plate 200 introduces beneficial properties of an electric insulator while simultaneously introducing the property of high thermal conductivity at cryogenic temperatures; the thermal conductivity of the sapphire plate 200 is twice the thermal conductivity of oxygen free hard copper at 80° K. Thus, allowing heat conduction out of HPGe crystal container 50 and preventing electrical conduction into container 50. This minimizes electrical noise from components, such as mechanical cooler 210, that degrades HPGe crystal 110 detection capability. Therefore, the temperature of HPGe crystal 110 is drawn down to and maintained at 105° K. Although this temperature is ~25° K higher than liquid-nitrogen-cooled germanium detectors, the aforementioned design improvements allow for HPGe crystal 110 resolution to be maintained at an acceptable level for gamma-ray measurements.

An exterior vacuum pump, connected to outside vacuum connection 260, initially creates the vacuum in enclosure 80, between the walls of cryostat 40 and HPGe crystal container 50. The vacuum is maintained by utilization of both metal-vacuum getter 240 (a material that chemically bonds gases created due to normal out-gassing of surface contamination of component metal parts) and ion pump 250, which pumps out lower pressures of residual gasses in order to maintain a vacuum on the order of $10^{-8}$ Torr. Vacuum line 230 penetrates flange 220 as well and provides a flowpath to metal getter 240, ion pump 250, and outside vacuum connection 260.

Over time, the vacuum in enclosure 80 tends to decrease. The use of the metal getter alone can attain an initial vacuum ($\leq 10^{-4}$ Torr) in harsh environments or after long periods of un-powered storage. By applying an external heat source to metal getter 240 the requisite vacuum is re-established through chemical sorbtion, after which battery powered ion pump 250 can establish the long term operating vacuum.

FIGS. 3 and 4 are pictorial illustrations to aid in understanding the assembly of the major detector components. FIG. 3 shows cryostat 40 containing HPGe crystal container 50 and is connected by way of flange 220 to the support components: mechanical cooler 210, vacuum line 230, metal getter 240, ion pump 250, and outside vacuum connection 260. Indium seals 170 are shown between cryostat 40 and cryostat end cap 45 and cryostat 40 and flange 220.

FIG. 4 shows an assembled HPGe crystal container 50. HPGe crystal 110 is placed between tapered Teflon rings 120 and inserted into container 50. Container cap 55 is bolted to container 50 with indium seal 170 in between.

The handheld radio-isotope identification system uses the aforementioned miniaturized HPGe detector as the centerpiece of the package that also includes two He³ neutron detectors and compact electronics package. The compact, handheld, and ruggedized design features allow for field use in almost every conceivable environment.

The operational concept for use is to approach items to be scanned by first selecting the bismuth germinate shield detector, which, as previously mentioned, exhibits a high interaction cross-section for gamma rays. The next step is to scan using the neutron detectors. Upon detection of gamma rays or neutrons, the HPGe detector is selected for use through the keypad interface of the electronics package. The HPGe detector is then used to determine the actual isotope or isotopes that are emitting the gamma rays. The electric signal from the HPGe detector crystal is directed through a co-axial cable to a preamplifier, followed by a signal processing pulse shaping amplifier, and then to an analog-to-digital converter where the signal pulse height is measured. The signal pulse height corresponds to the energy deposited in the HPGe detector crystal. A pulse height distribution is built up by counting the number of incident gamma ray interactions.

The radioactive isotope that produced the incident gamma rays is determined from the gamma ray pulse height information provided from signal processing boards, by comparing the detected pulse height to known gamma ray pulse heights stored in the electronic library residing within the electronics package. The user may then ascertain more information about other unknown materials residing in the scanned item, by selecting input from a shielded (cadmium wrapped) and an unshielded He³ neutron detector. Through a comparison of their readings it is possible to determine the thickness of hydrogen polymer, water, or high explosive that lies within the scanned item.

Figure 5:
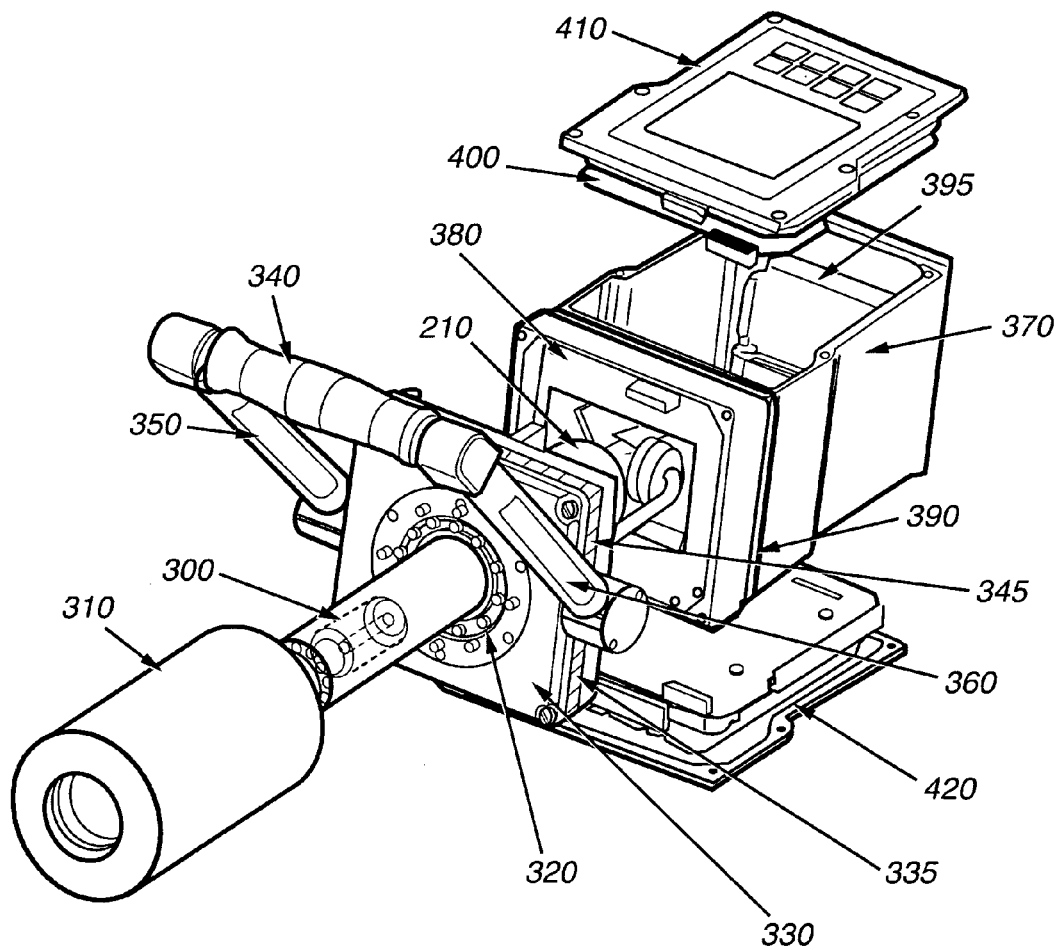
FIG. 5 s an exploded view of the handheld isotope identification system according to one embodiment of the present invention.

Referring now to FIG. 5, HPGe detector 300 resides within bismuth-germinate shield detector 310 and is attached by flange 320 which is bolted to front cover 330. Movable carrying handle 340 is connected on either side of front cover 330 and contains within it a shielded He³ neutron detector 350 on one side and an unshielded He³ neutron detector on the opposite side 360. Enclosure 370 is an anodized aluminum body that is the support structure for the entire system. Front cover 330 is attached to the front of enclosure 370. Preamplifier board 335 and high voltage board 345 are attached to front cover 330. Interface board 380 is secured within enclosure 370 directly behind high voltage board 345. Aluminum plate 390 is secured within enclosure 370 directly behind interface board 380 and is used as a thermal conduit for heat to pass from mechanical cooler 210 to enclosure 370 for dissipation to the surrounding environment and to act as an electrical ground plane between the analog and digital circuits within the electronics package. Mechanical cooler controller board 395 is placed at the rear of the enclosure and operates mechanical cooler 210. Data transfer board 400 is attached to the bottom of electronics package 410, which contains a signal processing board, an electronic library of gamma ray pulse heights, and a display/keypad interface. Battery sub-assembly 420 is inserted into the bottom of enclosure 370 and provides all the power requirements for the complete system.

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A portable radiation detector, comprising:
   a. a high-purity germanium crystal exhibiting a length to width ratio greater than 1:1 and oriented in said detector to receive radiation along the width of said crystal,
   b. a container pressurized with ultra-pure nitrogen, said high-purity germanium crystal located within said container, and
   c. a cryostat with a vacuum within, where said container is located within said cryostat.

2. A portable radiation detector, comprising:
   a. a high-purity germanium crystal exhibiting a length to width ratio greater than 1:1 and oriented in said detector to receive radiation along the width of said crystal,
   b. a shield detector, used to reduce Compton scattering effect, secured over said high-purity germanium crystal, and
   c. a first He³ neutron detector shielded by a neutron absorbing material and a second unshielded He³ neutron detector, for determining a thickness of hydrogen polymer, water, or high explosive within a scanned item.

3. The detector apparatus according to claim 2, further comprising,
   d. a container pressurized with ultra-pure nitrogen, said high-purity germanium crystal located within said container, and
   e. a cryostat with a vacuum within, where said container is located within said cryostat.

4. The detector apparatus according to claim 2, where said shield detector incorporates aluminum and visco-elastic polymer as impact absorption materials to increase ruggedness of said detector.

5. The detector apparatus according to claim 2, where said first He³ neutron detector and said second He³ neutron detector are incorporated into a carrying handle in order to further reduce detector size and increase portability.

* * * * *